Feb. 6, 1968     I. G. CHARTER     3,367,244

PRESSURE-SENSITIVE DEVICES

Filed July 22, 1965

INVENTOR.
Ian G. Charter

3,367,244
PRESSURE-SENSITIVE DEVICES
Ian G. Charter, Epsom, England, assignor to The Solartron Electronic Group Limited, Hampshire, England
Filed July 22, 1965, Ser. No. 474,111
Claims priority, application Great Britain, July 23, 1964, 29,689/64
14 Claims. (Cl. 92—13)

ABSTRACT OF THE DISCLOSURE

A pressure-sensitive device is disclosed wherein a portion of a backing member which is to act as a stop is made flexible. An adjustable stress is provided to the flexible portion of the backing member until this portion assumes a predetermined configuration. A groove may be formed in the backing member to alter the stress distribution and, hence, the configuration of the flexible portion.

---

Figure 1:
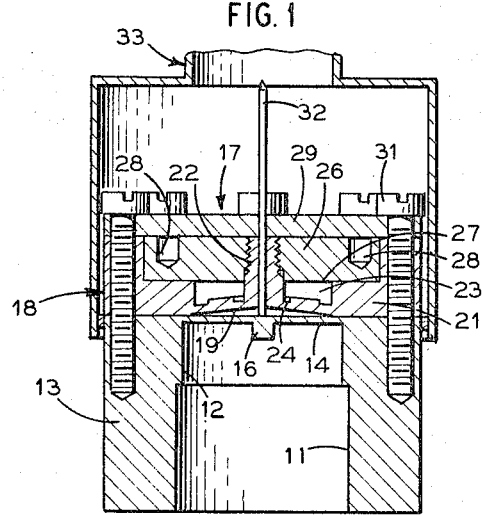

This invention relates to pressure-sensitive devices having flexible diaphragms and over-pressure stops to support their diaphragms against undue distortion.

Pressure-sensitive devices are already known of the type comprising a flexible diaphragm, which alters its configuration in response to changes in the difference between the pressures on its two sides, and an over-pressure stop including a backing member positioned with at least part of one face close to a face of the diaphragm to act as a stop and prevent the diaphragm from being distorted by more than a predetermined amount in the direction of the backing member, the configuration of the said one face of the backing member being predetermined such that, when contact takes place between the faces of the diaphragm and the backing member, it takes place over substantially the entire area of the diaphragm face or of a predetermined part or parts of the diaphragm face. Difficulty has been experienced in the past in manufacturing the backing member for a pressure-sensitive device of the type specified so that its said one face has exactly the correct predetermined configuration. Machining of the face, for example, has been tried, but has proved difficult and time-consuming.

It is one object of the present invention to provide an improved pressure-sensitive device of the type specified.

This invention is particularly applicable though not limited to pressure-sensitive devices of the type specified in which the useful deflection of the diaphragm in the direction of the backing member is a small proportion of the diameter of the diaphragm and in which the means of measuring the deflection of the diaphragm take the form of an electrical resistance element or an arrangement of such elements joined mechanically to the diaphragm in such a way that the deflection of the diaphragm causes the element or elements so to be strained as to undergo a change in electrical resistance.

The means of measuring the diaphragm deflection may take other forms such as a coil or system of coils suitably arranged on a circuit of magnetic material one or more parts of which circuit being so joined to the diaphragm that the distortion of the diaphragm causes the movable part or parts of the magnetic circuit to move in such a way as to change the electrical characteristics of the coil or system of coils.

According to the present invention, in a pressure-sensitive device of the type specified that part of the backing member which is to act as a stop is flexible and means are provided which apply a stress to the said part of the backing member and thus strain it into a predetermined configuration such that, when the diaphragm is distorted by the predetermined amount, contact takes place between the faces of the diaphragm and backing member over substantially the entire area of an appropriate part or parts of the diaphragm face.

Figure 2:
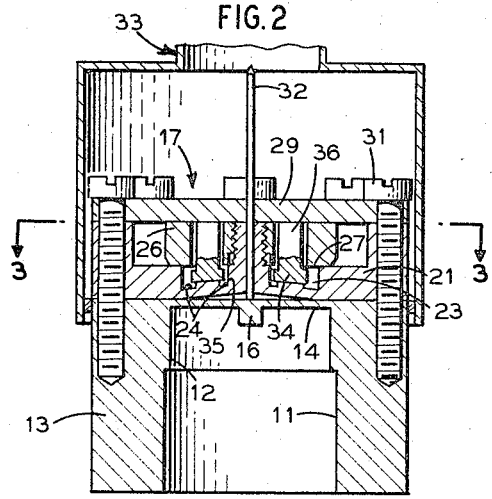
Figure 3:
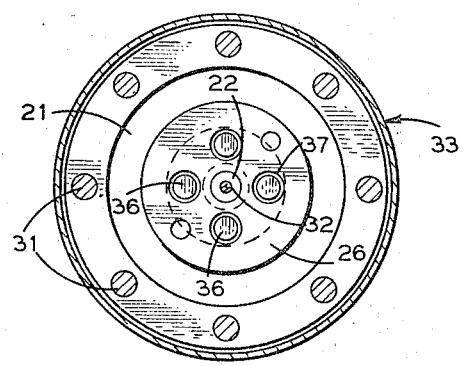

The invention will now be described by way of example with reference to the accompanying drawings in which:

FIGURE 1 is a sectional side elevation of one embodiment of a pressure-sensitive device, FIGURE 2 is a sectional side elevation of another embodiment of a pressure-sensitive device, and FIGURE 3 is a section on the line III—III in FIGURE 2.

Referring to the drawings a tapping 11 is provided off a pipe (not shown) in which it is desired to measure the fluid pressure. The end of the tapping 11 remote from the pipe is joined into an open end of a cylindrical passage 12 formed in a metal block 13. The other end of the passage 12 is covered by a thin circular diaphragm 14 formed integrally with the block. The face of the block 13 and diaphragm 14 remote from the tapping 11 is lapped flat and the other face of the diaphragm has a small, solid, central, cylindrical boss 16 situated axially upon it for a purpose to be described later.

An over-pressure stop 17 is provided which includes a metal backing member having the general shape of a hollow cylinder, one end of the cylinder being closed and the other end open. A face 19 is formed on the exterior surface of the closed end of the hollow cylinder by, for example, lapping flat this end of the cylinder. An annular region 21 forms the remaining portion of the closed end of the cylinder and includes a flat annular shoulder for seating thereon certain of the hereinafter described components. An axial stud 22 of generally cylindrical shape is secured to and extends upwardly from the closed end of the hollow cylinder towards its open end. A coaxial, annular depression or cavity 23 is formed by the annular inner wall of the region 21 and a portion of the outer surface of the stud 22 which is proximate the closed end of the hollow cylinder. The annular depression 23 extends in a direction parallel to the axis to within a short distance of the outside lapped-flat face 19 and in consequence the central region of the backing member is flexible, being of relatively thin metal. Coaxial annual grooves 24 are formed in the base of the annular depression 23 for a purpose to be described later. The uppermost end of the stud 22 is externally screw-threaded, and has a small-diameter hole bored axially through it.

A nut 26 is provided which cooperates with the backing member 18 and has a central, internally screw-threaded, axial bore whereby it is screwed onto the stud 22. The nut 26 has a flat surface 27 which, when the nut 26 is screwed onto the stud 22, bears at its peripheral margin against the outer region 21 of the inside face of the wall of the closed end of the backing member 18, which forms an annular abutment surface. Two recesses 28 are formed in the opposite surface of the nut 26 and are arranged for engagement by a tool for tightening the nut.

Supporting means are provided, being constituted by a limiting stop in the form of a rigid plate 29 which fits over the open end of the backing member 18 and the said opposite surface of the nut 26. A small-diameter hole is bored axially through the rigid plate 29. Eight holes are bored in corresponding positions equally spaced around the peripheral regions of the rigid plate 29, the backing member 18, and the block 13 and parallel with their axes. The holes pass through the rigid plate 29, through the cylindrical side wall of the backing member 18, and for a short distance into the body of the block 13. In the block 13, the said holes are internally screw-threaded. Eight bolts 31 are provided, which are arranged to pass through the holes, and their ends remote from their heads are externally screw-threaded to cooperate with the screw threads in the holes in the block 13.

The device is set up for operation by screwing the nut 26 onto the stud 22. The screwing is continued until the flat surface 27 of the nut 26 bears at its peripheral margin against the outer region 21 of the backing member 18. The nut 26 is then screwed further, and, on account of the intermediate annular depression 23 in the inside face of the wall of the closed end of the backing member 18, it acts, in cooperation with the stud 22 and the outer region 21 of the backing member, as an adjustable mechanical straining means and applies an adjustable axial stress to the flexible central region of the backing member 18. The outside, initially flat face 19 of the backing member 18 is thus strained into a curved configuration, which curved configuration is adjusted to a predetermined form by screwing the nut 26 on the stud 22. Furthermore, the stress distribution in the backing member is altered by the grooves 24 and hence the curvature of the initially flat face 19 is modified. When the predetermined configuration of the initially flat face 19 is obtained, the screwing is stopped. Adjustment of the backing member 18 having been completed, the end remote from the diaphragm 14 of the stud 22 is so lapped that it is coplanar with the open end of the backing member 18. The rigid plate 29 is then fitted with one face abutting against the stud 22 and the rim of the open end of the backing member 18. The bolts 31 are passed through the holes in the rigid plate 26 and the backing member 18, and are screwed into the internally screw-threaded holes in the block 13 to secure the device together. The rigid plate 28 acts as a limiting stop, since it is in abutment with the stud 22 and prevents the central portion of the backing member 18 from being further strained under pressure from the diaphragm 14. A thin rod 32, which is operatively connected with the sensing element of a transducer 33, is passed through the small-diameter axial holes in the stud 22 and the rigid plate 29. One of the ends of the rod 32 is positioned against the center of the diaphragm 14, and the rod 32 is biased into constant contact with the diaphragm by resilient means (not shown). The small boss 16 on the diaphragm 14 is provided in order to strengthen its central region and prevent it from being damaged by the rod 32. The transducer 33 is fixedly mounted by being spot welded to the block 13.

The device operates as follows: when the diaphragm 14 is distorted by the predetermined amount by the fluid pressure, contact takes place between the faces of the diaphragm 14 and the backing member 18 over substantially the entire area of the diaphragm face. Further distortion of the diaphragm 14 in the direction of the backing member 18 is then prevented.

The embodiment of the invention shown in FIGURES 2 and 3 differs from that shown in FIGURE 1 in that additional supporting means for the backing member 18 are provided. These additional supporting means are constituted by a circular table 34, which is arranged between the nut 26 and the backing member 18.

The table 34 has a central, axial aperture 35, through which the stud 22 passes, in use, and in which the stud 22 is a sliding fit, and four legs 36 which extend parallel to its axis and project through four apertures 37 which are formed in the nut 26. The surface of the table 34 remote fom the nut 26 is of a curved configuration and its outside diameter is such that it fits within the annular depression 23 in the backing member 18. The configuration of the surface of the table 34 remote from the nut 26 is such that, when the backing member 18 has been strained, as described above, so that its initially flat face 19 has assumed its predetermined curved configuration, contact takes place between the surface of the table 34 remote from the nut 26 and the surface of the backing member 18 remote from the diaphragm 14 over substantially the whole of the latter surface between the stud 22 and the other region 21, with the exception of the grooves 24.

The embodiment of the invention shown in FIGURES 2 and 3 is set up for operation in the following manner.

The table 34 is first placed in the annular depression 23 and the stud 22 is passed through the central aperture 35 in the table 34. The nut 26 is so arranged that the legs 36 pass through the apertures 37 in the nut 26 and is then screwed onto the stud 22 in similar manner to that described above with reference to the embodiment of the invention shown in FIGURE 1. As the nut 26 is screwed onto the stud 22 the table 34 is carried around with it, and, when the backing member 18 has been strained into its curved configuration, contact takes place, as previously described, between the surfaces of the table 34 and backing member 18 over substantially the whole of the latter between the stud 22 and the outer region 21 with the exception of the grooves 24. The ends of the legs 36 of the table 34, together with the end of the stud 22, are then so lapped as to be coplanar with the open end of the backing member 18, after which the rigid plate 29 is fitted over the open end of the backing member 18 in abutment with the stud 22 and the legs 36 and the whole device is secured together with the bolts 31 as described above with reference to the embodiment shown in FIGURE 1. Since the rigid plate 19 is in abutment with the legs 36, the table 34 is prevented from moving axially and substantially the entire central portion of the backing member 18, with the exception of the grooves 24, is therefore supported against distortion under pressure from the diaphragm 14.

A convenient manner in which the configuration of the surface of the table 34 remote from the nut 26 can be adapted to the required form for contacting the surface of the backing member 18 between the stud 22 and the outer region 21 will now be described. Before assembly of the pressure-sensitive device, the backing member 18 is bolted down to a flat, lapped surface with the edge portions of its initially flat surface contacting the said lapped surface but the central portion of its initially flat surface separated from the lapped surface by a circular washer laid on the lapped surface. The diameter of the washer is not greater than that of the stud 22 on the backing member 18 and its thickness is equal to the displacement of the central portion of the backing member between the initial, flat configuration and the pre-determined, curved configuration of the backing member 18. On account of the washer the backing member 18 is strained, when bolted down to the lapped surface, into its predetermined curved configuration. The table 34 is then placed on the backing member 18 with the stud 22 passing through its central aperture 35 and its legs 36 projecting away from the backing member 18 and its surface remote from the legs 36 is lapped against the backing member 18 until it attains a curved configuration such that it is in contact with substantially the whole of the surface of the backing member 18 between the stud 22 and the outer region 21 with the exception of the parts occupied by th grooves 24. The required configuration of the surface of the table 34 having been attained, the table 34 and the backing member 18 can be dismantled from the lapped surface and the pressure-sensitive device can be set up for operation in the manner described above.

It will be appreciated that the configuration of both the diaphragm 14 and the backing member 18 may vary widely and that it may be desirable in certain instances for contact between them to take place only over certain parts of the diaphragm 14 rather than over its entire area when the diaphragm has been distorted by the predetermined amount. The configuration of the backing member 18 can, of course, be adjusted to achieve this. For example, a corrugated diaphragm may be employed and the backing member may be so arranged that, when the diaphragm has been distorted by the predetermined amount, contact takes place between it and the diaphragm only at the tips of the corrugations. Alternatively, one or both faces of the diaphragm 14 may be curved in its unstrained condition. Furthermore, whatever the unstrained shape of the diaphragm, the arrangement can be such that, when the diaphragm has been distorted by the predetermined amount, contact takes place between the backing member and the diaphragm only over an annular area situated at a predetermined radius from the center of the diaphragm.

The pressure-sensitive device with which an over-pressure stop as described above is used may take the form of a force balance instrument. In such an instrument it is arranged, by means of a closed loop control system, that a force is applied to the diaphragm so as to restore its position to one of zero displacement under all conditions of applied pressure. The magnitude of the force required to restore the diaphragm is a measure of the applied pressure. An over-pressure stop as described above can be used without modification with such a device.

What is claimed is:

1. A pressure-sensitive device of the type specified including
    a diaphragm,
    a backing member spaced from the said diaphragm,
    a flexible part of the said backing member to act as a diaphragm stop,
    adjustable mechanical straining means to apply a stress to the said flexible part to strain it into a predetermined configuration,
    and connecting means connecting the said straining means to the said flexible part.

2. A device as claimed in claim 1 wherein
    the surface of the backing member remote from the diaphragm is formed with a groove to alter its configuration under stress.

3. A device as claimed in claim 1 including
    supporting means to support the backing member against distortion out of its said predetermined configuration.

4. A device as claimed in claim 3 wherein
    the surface of the backing member remote from the diaphragm is formed with a groove to alter its configuration under stress.

5. A pressure-sensitive device of the type specified including
    a diaphragm,
    a backing member spaced from the said diaphragm,
    a flexible part of the said backing member to act as a diaphragm stop, and
    adjustable mechanical straining means to apply a stress to the said flexible part to strain it into a predetermined configuration, the said straining means comprising
        a screw-threaded member rigid with the flexible part of the backing member and extending from it in a direction away from the diaphragm,
        a nut,
        a screw thread on the nut to engage the screw-threaded member,
        and an abutment means having a surface to engage a peripheral margin portion of the nut.

6. A device as claimed in claim 5 wherein
    the surface of the backing member remote from the diaphragm is formed with a groove to alter its configuration under stress.

7. A device as claimed in claim 5 including
    supporting means to support the backing member against distortion out of its said predetermined configuration.

8. A device as claimed in claim 7 wherein
    the surface of the backing member remote from the diaphragm is formed with a groove to alter its configuration under stress.

9. A pressure-sensitive device of the type specified including
    a diaphragm,
    a backing member spaced from the said diaphragm,
    a flexible part of the said backing member strained into a predetermined configuration to act as a diaphragm stop,
    adjustable mechanical straining means applying a stress to the said flexible part to strain it into the said predetermined configuration, the said straining means comprising
        a nut,
        a screw-threaded member rigid with the said flexible part,
        a screw-thread on the nut engaging the screw-threaded member,
        and an abutment means having a surface engaging a peripheral margin portion of the nut,
        and supporting means to support the backing member against distortion out of its said predetermined configuration including
        a limiting stop comprising
        a rigid plate mounted fixedly with one face abutting against the end of the screw-threaded member remote from the diaphragm.

10. A device as claimed in claim 9 wherein
    the surface of the backing member remote from the diaphragm is formed with a groove to alter its stress distribution and modify its configuration.

11. A device as claimed in claim 9 wherein the supporting means includes
    a table arranged between the backing member and the nut,
    a central region of the table through which the screw-threaded member passes,
    a surface of the table remote from the nut contacting at least part of the flexible part of the backing member remote from the diaphragm,
    and means for preventing displacement of the table in a direction away from the diaphragm.

12. A device as claimed in claim 11 wherein
    the surface of the backing member remote from the diaphragm is formed with a groove to alter its stress distribution and modify its configuration.

13. A device as claimed in claim 11 wherein the said means for preventing displacement of the table include
    legs extending from the table through apertures in the nut and having their ends in abutment with the rigid plate.

14. A device as claimed in claim 13 wherein
    the surface of the backing member remote from the diaphragm is formed with a groove to alter its stress distribution and modify its configuration.

References Cited

UNITED STATES PATENTS

| | | | |
|---|---|---|---|
| 1,183,486 | 5/1916 | Pardue | 92—13 |
| 2,503,594 | 4/1950 | Phelps | 92—94 |
| 2,703,107 | 3/1955 | Baker | 92—94 |
| 2,787,681 | 4/1957 | Roeser | 92—94 X |
| 2,811,172 | 10/1957 | Frazel | 92—6 |
| 2,839,926 | 6/1958 | Woods et al. | 92—95 X |
| 2,989,085 | 6/1961 | Giovanni | 73—406 X |
| 3,072,150 | 1/1963 | Hastings et al. | 92—98 |
| 3,128,632 | 4/1964 | Green | 92—95 X |
| 3,181,432 | 5/1965 | Puster | 92—6 |

MARTIN P. SCHWADRON, *Primary Examiner.*

I. C. COHEN, *Assistant Examiner.*